US012802721B2

(12) United States Patent
Björk et al.

(10) Patent No.: US 12,802,721 B2
(45) Date of Patent: Nov. 17, 2026

(54) VIDEO PARSING AND AUDIO PAIRING

(71) Applicant: Epidemic Sound AB, Stockholm (SE)

(72) Inventors: Ulf Mathias Björk, Stockholm (SE); Daniel Gustav Klevebring, Stockholm (SE); Per-Anders Legeryd, Stockholm (SE); Carl August Thomé, Stockholm (SE); Björn Jesper Henriksson, Stockholm (SE); Sara Frantzen, Stockholm (SE); Karl Mikael Westman, Stockholm (SE); Rafael Ciciliotti Coimbra, Stockholm (SE)

(73) Assignee: EPIDEMIC SOUND AB, Stockholm (SE)

( * ) Notice: Subject to any disclaimer, the term of this patent is extended or adjusted under 35 U.S.C. 154(b) by 0 days.

(21) Appl. No.: 18/764,128

(22) Filed: Jul. 3, 2024

(65) Prior Publication Data

US 2025/0014610 A1 Jan. 9, 2025

Related U.S. Application Data

(60) Provisional application No. 63/511,846, filed on Jul. 3, 2023.

(51) Int. Cl.
*G11B 27/036* (2006.01)
*G06F 16/68* (2019.01)
(Continued)

(52) U.S. Cl.
CPC ............ *G11B 27/036* (2013.01); *G06V 20/46* (2022.01); *G06V 20/63* (2022.01); *G06V 30/19* (2022.01)

(58) Field of Classification Search
None
See application file for complete search history.

(56) References Cited

U.S. PATENT DOCUMENTS 10,381,022 B1 * 8/2019 Chaudhuri .............. G10L 25/57
10,685,680 B2 6/2020 Dai et al.
(Continued)

FOREIGN PATENT DOCUMENTS

| | | | |
|---|---|---|---|
| EP | 1050048 | B1 | 8/2005 |
| WO | 2023009104 | A1 | 2/2023 |
| WO | 2023131864 | A1 | 7/2023 |

OTHER PUBLICATIONS

International Search Report and Written Opinion for PCT Patent Application No. PCT/IB2024/056529 mailed Oct. 14, 2024, 15 pgs.

*Primary Examiner* — Hung Q Dang
(74) *Attorney, Agent, or Firm* — Buchalter; Jason W. Croft

(57) ABSTRACT

A method includes obtaining a video including multiple frames. The method may also include identifying a particular frame of the multiple frames. The method may further include obtaining one or more representations associated with the particular frame from a model. The method may also include generating one or more recommended audio segments associated with the particular frame by the model. The method may further include causing a graphical user interface (GUI) to display the one or more recommended audio segments associated with the particular frame. The method may also include causing the GUI to display the updated one or more recommended audio segments associated with the particular frame. The method may further include obtaining a selection of a particular audio segment from the updated one or more recommended audio segments. The method may also include combining the particular audio segment with the particular frame.

20 Claims, 9 Drawing Sheets

(51) Int. Cl.
*G06V 20/40* (2022.01)
*G06V 20/62* (2022.01)
*G06V 30/19* (2022.01)

(56) References Cited

U.S. PATENT DOCUMENTS

| | | | |
|---|---|---|---|
| 11,030,479 | B2 | 6/2021 | Krishnamurthy |
| 11,450,353 | B2 | 9/2022 | Krishnamurthy et al. |
| 11,456,017 | B2 | 9/2022 | Plom et al. |
| 11,769,528 | B2 | 9/2023 | Patterson et al. |
| 2021/0004402 | A1 | 1/2021 | Li et al. |
| 2022/0335972 | A1* | 10/2022 | Evans .................. G11B 27/031 |
| 2022/0414381 | A1 | 12/2022 | Gautam et al. |
| 2024/0087558 | A1* | 3/2024 | Oplustil Gallegos ... G10L 13/08 |

* cited by examiner

VIDEO PARSING AND AUDIO PAIRING

CROSS REFERENCE TO RELATED APPLICATIONS

This U.S. Patent Application claims priority to U.S. Provisional Patent Application No. 63/511,846, titled "VIDEO TO AUDIO RECOMMENDATION SYSTEM," and filed on Jul. 3, 2023, the disclosure of which is hereby incorporated by reference in its entirety.

TECHNICAL FIELD

This disclosure relates to multimedia systems, and more specifically, to content creation, compilation, and editing systems.

BACKGROUND

Unless otherwise indicated herein, the materials described herein are not prior art to the claims in the present application and are not admitted to be prior art by inclusion in this section.

Preparing text and/or audio to pair with various video clips and frames is often a tedious and time consuming operation. For creators that may rely on pairing many audio segments and/or text to videos and frames, the amount of time invested may be an opportunity cost to create additional content.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an example embodiment, a method may include obtaining a video including multiple frames. The method may also include identifying a particular frame of the multiple frames. The method may further include obtaining one or more representations associated with the particular frame from a model. The model may be trained using inputs from one or more multiple of data pairs, text representations, and/or image representations. The method may also include generating one or more recommended audio segments associated with the particular frame by the model. The recommended audio segments may be based on a similarity of the one or more representations to one or more database audio segments stored in a database. The method may further include causing a graphical user interface (GUI) to display the one or more recommended audio segments associated with the particular frame. The method may also include obtaining an additional text representation from a user input. The method may further include updating the one or more recommended audio segments associated with the particular frame based on the additional text representation. The method may also include causing the GUI to display the updated one or more recommended audio segments associated with the particular frame. The method may further include obtaining a selection of a particular audio segment from the updated one or more recommended audio segments. The method may also include combining the particular audio segment with the particular frame.

In another embodiment, a system may include a model, a database, and a processor. The processor may be operable to obtain a video including multiple frames. The processor may also be operable to identify a particular frame of the multiple frames. The processor may further be operable to obtain one or more representations associated with the particular frame from the model. The model may be trained using inputs from one or more of multiple data pairs, text representations, and/or image representations. The processor may also be operable to obtain one or more recommended audio segments associated with the particular frame based on a similarity of the one or more representations to one or more database audio segments stored in the database. The one or more recommended audio segments may be generated by the model. The processor may further be operable to cause a graphical user interface (GUI) to display the one or more recommended audio segments associated with the particular frame. The processor may also be operable to obtain an additional text representation from a user input. The processor may further be operable to update the one or more recommended audio segments associated with the particular frame based on the additional text representation. The processor may also be operable to cause the GUI to display the updated one or more recommended audio segments associated with the particular frame. The processor may further be operable to obtain a selection of a particular audio segment from the updated one or more recommended audio segments. The processor may also be operable to combine the particular audio segment with the particular frame.

The objects and advantages of the embodiments will be realized and achieved at least by the elements, features, and combinations particularly pointed out in the claims.

Both the foregoing general description and the following detailed description are given as examples and are explanatory and not restrictive of the invention, as claimed.

DESCRIPTION OF DRAWINGS

Example implementations will be described and explained with additional specificity and detail using the accompanying drawings in which.

DETAILED DESCRIPTION

In generating digital content, audio segments and/or text is often paired with a video that may be a part of a video production and/or frames of the video to create a finished digital product. In some instances, the audio segments and/or text may vary based on what may be displayed within the video. Further, selecting particular audio segments and/or text for every video production and/or frame may be a time consuming process that may detract from generating more content or perform other actions. What is needed is a solution to automatically generate audio segments and/or text that may be paired with a video production, such that the user thereof may simply select from a list of recommendations, rather than be responsible for locating and determining audio segments for each video production. In the present disclosure, a video production may refer to a video and/or related aspects of a video, such as XML files, storyboards, description(s) associated with the video, and so forth. The XML files may individually include source material, video clips, usage metrics, a record of edits to the video, a duration of the video production, an aspect ratio, and/or other details associated with the video production and the components thereof. The present disclosure may refer to video, but any of the components of the video production may be interchanged with video to accomplish various aspects of the disclosure.

Some prior approaches attempt to solve the problem by using tags associated with the video and generating audio segments based on the tags. The tags included in the video may be inserted by machine learning and/or manually inserted, which may still account for a great effort and/or amount of time expended, and/or the tags are external objects relative to the video and not easily used in calculations associated with the video.

Aspects of the present disclosure address these and other limitations by using a model trained on representations obtained from the video, including image representations and/or text representations, to determine recommended audio segments for any video or frame therein. The representations may be embeddings within the video, and thus accessible by operations, as the embeddings may be represented in a vector space and/or may be operated on by at least machine learning algorithms. As such, a video may be represented by various components, and based on the representations, a model may generate recommended audio segments and/or recommended text to be used in conjunction with a video, such that the pairing of the video with audio and/or text may be accomplished more quickly and with better accuracy and results. Aspects of the present disclosure may be used in various settings, which may include, but not be limited to, video editing applications, video posting platforms, social media applications, video chat and/or communication tools, video streaming platforms, and the like.

Figure 1:
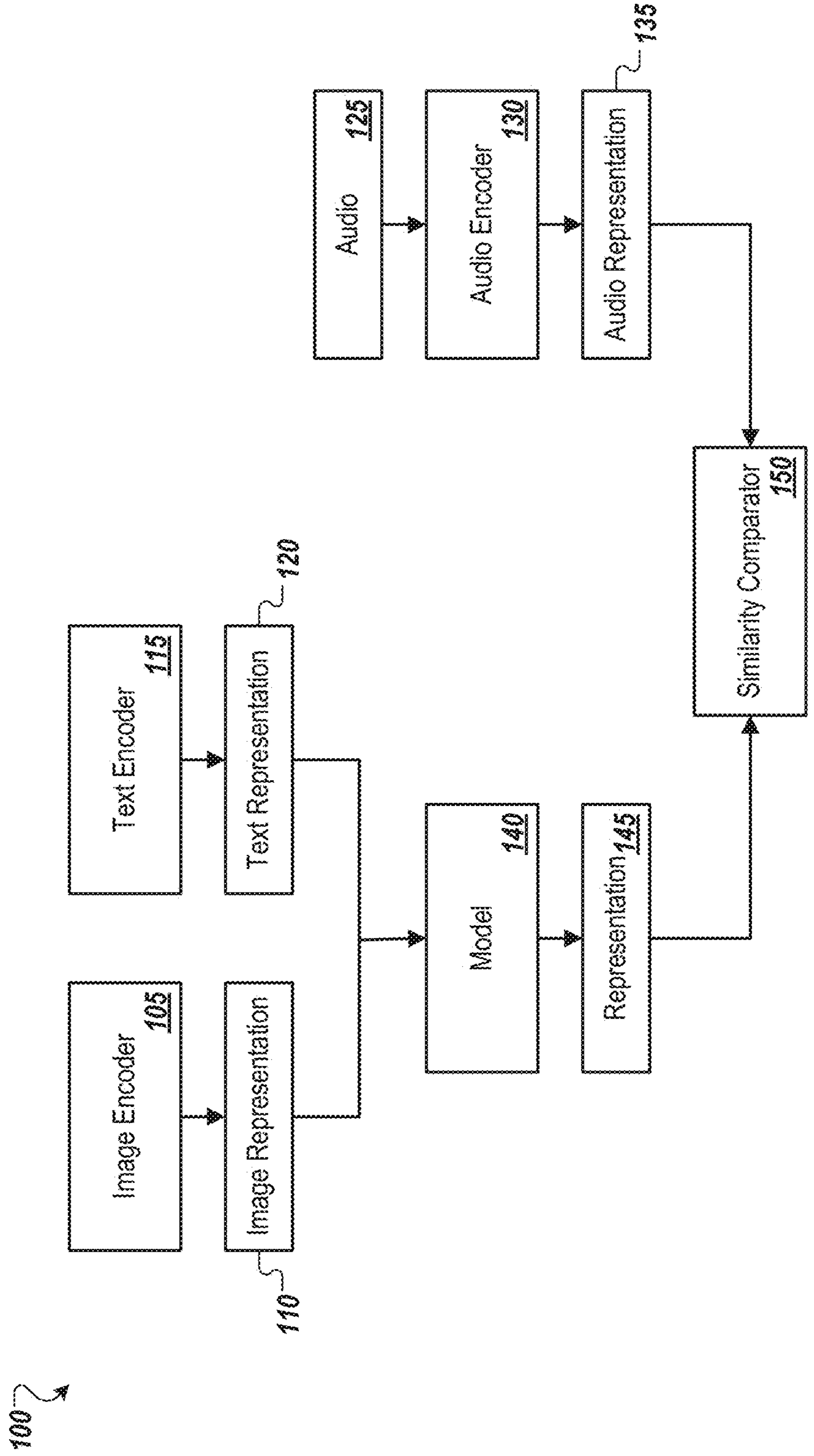
FIG. 1 illustrates a block diagram of an example system for training a model for video parsing and audio pairing.

FIG. 1 illustrates a block diagram of an example system 100 for training a model 140 for video to audio recommendation, in accordance with at least one embodiment of the present disclosure. The system 100 may include an image encoder 105, an image representation 110, a text encoder 115, a text representation 120, audio 125, an audio encoder 130, an audio representation 135, a model 140, a model representation 145, and a similarity comparator 150.

The system 100 (and/or other variations of systems described in the present disclosure) may be operable to obtain a video, perform an analysis on at least a portion of the video (e.g., a frame of the video), and generate audio recommendations to match the frame. In some instances, one or more frames may be analyzed in conjunction with various inputs, such as text representations 120, image representations 110, and/or various audio, to drive an audio segment recommendation for the frames. In some instances, the audio segment recommendation may be generated in view of at least a prior audio segment recommendation. For example, a prior audio segment recommendation may have been generated based on a first frame and the prior audio segment recommendation may be used in part to generate a subsequent audio segment recommendation for a subsequent frame (where the subsequent frame may be in the same video as the first frame or a different video). In some instances, the text inputs (e.g., the text representations 120) may be generated by a user of the system 100, may be extracted from the video or a frame of the video, and/or may be inferred based on an analysis of the video or a frame of the video. For example, a text label may be obtained from the frame and may be used to update the audio segment recommendations. In another example, a text label may be obtained from a user input and may be used to update the audio segment recommendations.

In the present disclosure, component parts of video, image, audio, and/or text may be described as a representation. In some instances, a representation may be an embedding, which may include a representation of the various objects as a vector or in a vector space. As such, the representations may be meaningful and/or able to be operated on by various machine learning algorithms and techniques due, at least partially in part, to the nature of the representations. Therefore, in at least some instances, representations described herein may be interpreted as an embedding of the various objects, such that the model (which may employ machine learning and/or artificial intelligence) may be operable to implement the representations described herein.

The model 140 may be trained with a text representation 120 that may be generated by a text encoder 115. The text encoder 115 may be pre-trained with an image representation 110 that may be generated by the image encoder 105 in a shared latent space for input image, audio, and/or text. The audio encoder 130 may be pre-trained separately from the text encoder 115 using audio 125 and the audio encoder 130 may be operable to encode the audio 125 such that the audio representation 135 may sound similar to a user selected audio representation. In some instances, some techniques may include training the model 140 to translate the text representation 120 to become the same or similar to the audio representation 135 based on the training data.

In some instances, the training data for the model 140 may include many data pairs. The data pairs may be text-audio pairs which may illustrate a correlation between text and audio for the model 140 to train using. For example, "happy pop" may describe a first audio file and may be a first text-audio pair, "scary rock for Halloween" may described a second audio file and may be a second text-audio pair, and "unboxing the iPhone 14" may describe a third audio file and may be a third text-audio pair. In these and other embodiments, the text-audio pairs may be input to the model 140 to train the model 140 to create associations between text and audio.

Using a collection of the text-audio pairs, which may be obtained from music and/or sound effects, the model 140 may be trained to translate text (e.g., the text representation 120) and/or images (e.g., the image representation 110) into audio, which may be the same or similar as the audio representation 135. To train the model 140, the text encoder 115 may generate the text representation 120 which may be input to the model 140 and the audio encoder 130 may generate the audio representation 135. The model 140 may generate the model representation 145, and comparison between the audio representation 135 and the model representation 145 may be performed, such as by the similarity comparator 150. In some instances, the similarity comparator 150 may use machine learning techniques to determine the similarity, such as a gradient-descent based machine learning technique, which may maximize the similarity between the model representation 145 and the audio representation 135. In some instances, the similarity between the model representation 145 and the audio representation 135 may be a cosine similarity, a negative mean standard error similarity, and/or other similarity measures.

Modifications, additions, or omissions may be made to the system 100 without departing from the scope of the present disclosure. For example, the designations of different elements in the manner described is meant to help explain concepts described herein and is not limiting. Further, the system 100 may include any number of other elements or may be implemented within other systems or contexts than those described. For example, any of the components of FIG. 1 may be divided into additional or combined into fewer components.

Figure 2:
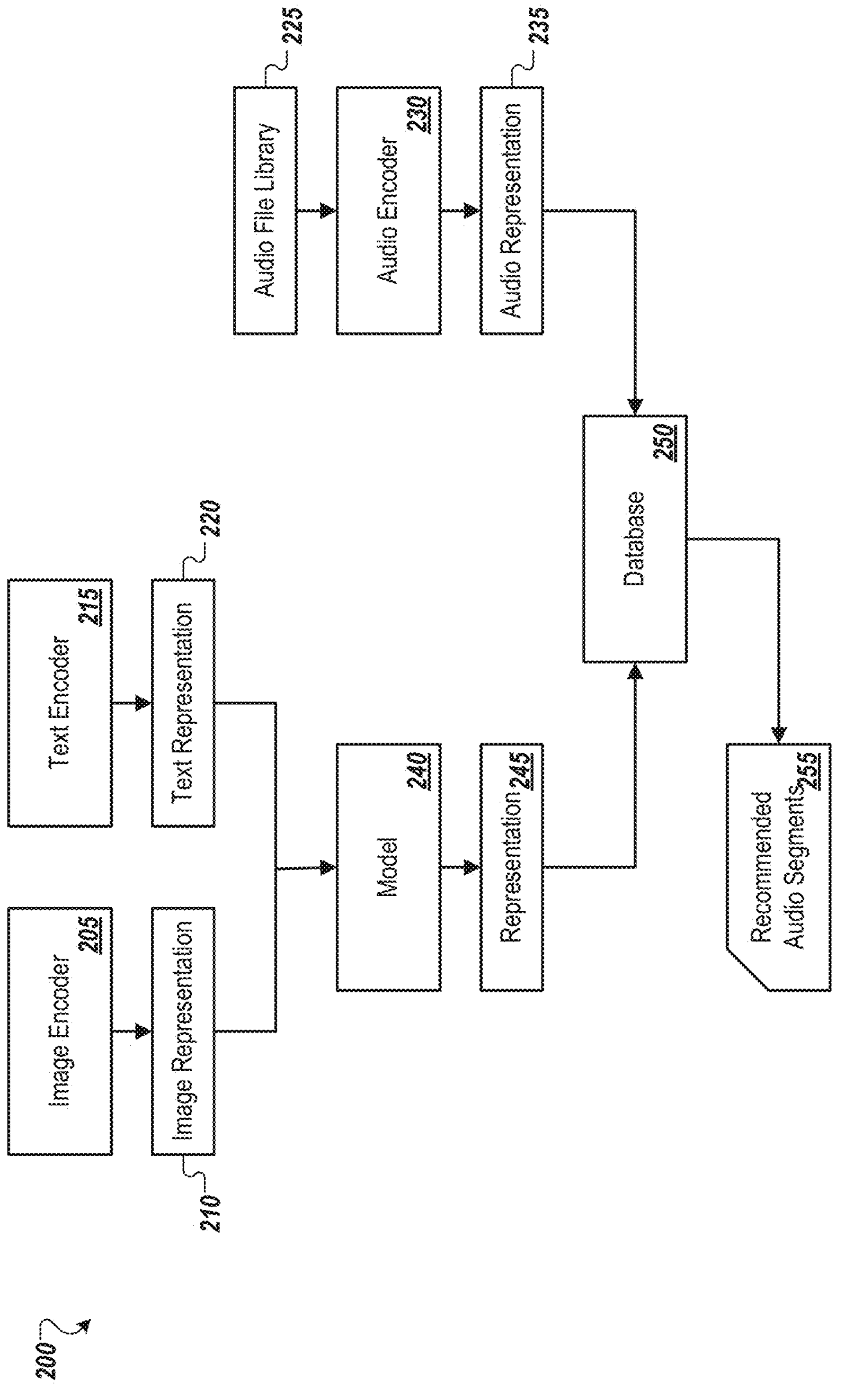
FIG. 2 illustrates a block diagram of an example system for video parsing and audio pairing.

FIG. 2 illustrates a block diagram of an example system 200 for video to audio recommendation, in accordance with at least one embodiment of the present disclosure. The system 200 may include an image encoder 205, an image representation 210, a text encoder 215, a text representation 220, an audio file library 225, an audio encoder 230, an audio representation 235, a model 240, a model representation 245, and a database 250.

The system 200 may include many same or similar elements as the system 100 of FIG. 1, where the same or similar elements may perform similar operations, unless described otherwise. For example, the image encoder 205, the image representation 210, the text encoder 215, the text representation 220, the audio encoder 230, the audio representation 235, the model 240, and the model representation 245 of FIG. 2 may be the same or similar as the image encoder 105, the image representation 110, the text encoder 115, the text representation 120, the audio encoder 130, the audio representation 135, the model 140, and the model representation 145, respectively, of FIG. 1.

In order to generate recommended audio segments 255 for users, the audio representation 235 may be precomputed and/or stored in the database 250. The audio representation 235 stored in the database 250 may be used for nearest-neighbor lookups within the database 250. In some instances, one or more frames and/or text input may be input into the image encoder 205 and/or the text encoder 215, respectively, and representations may be obtained therefrom including the image representation 210 and the text representation 220. In some instances, the image representation 210 and the text representation 220 may be combined (e.g., using mean pooling) and may be input into the model 240 to obtain the model representation 245. The model representation 245 may be used as a search query of the database 250, such as using nearest-neighbor lookups. In some instances, any number of representations may be pooled together and used as an input to the model 240.

In some embodiments, the various representations may be weighted. For example, the image representation 210 may have a greater weight (e.g., more importance to the model 240) than the text representation 220. In some instances, the weights may be a fixed value based on a type of representation. Alternatively, or additionally, the weights may be adjustable, such as by a user or operator of the system 200.

In some instances, the audio representation 235 based on the audio file library 225 may be precomputed using the audio encoder 230 and the results (e.g., the audio representation 235) may be stored in the database 250. At a lookup time (e.g., when a search is performed such as by the model 240), a frame from a video may be converted into the image representation 210 and/or the text representation 220, which may be combined (such as by mean pooling and/or other combination techniques) and input to the model 240. The model 240 may generate the model representation 245 which may be compared to the audio representation 235 stored in the database 250 based on a similarity between the model representation 245 and the audio representation 235. The result of the comparison may be output as the recommended audio segments 255.

In some instances, the recommended audio segments 255 may be obtained based on a projection of the representation 245 and/or the audio representation 235 into a different coordinate space (or a different coordinate system or dimension). For example, the representation 245 may be projected (e.g., a first projection) into a first coordinate space and/or the audio representation 235 may be projected (e.g., a second projection) into a second coordinate space (e.g., which may be the same or different from the first coordinate space), and the first projection and/or the second projection may be utilized to obtain the recommended audio segments 255.

Figure 3:
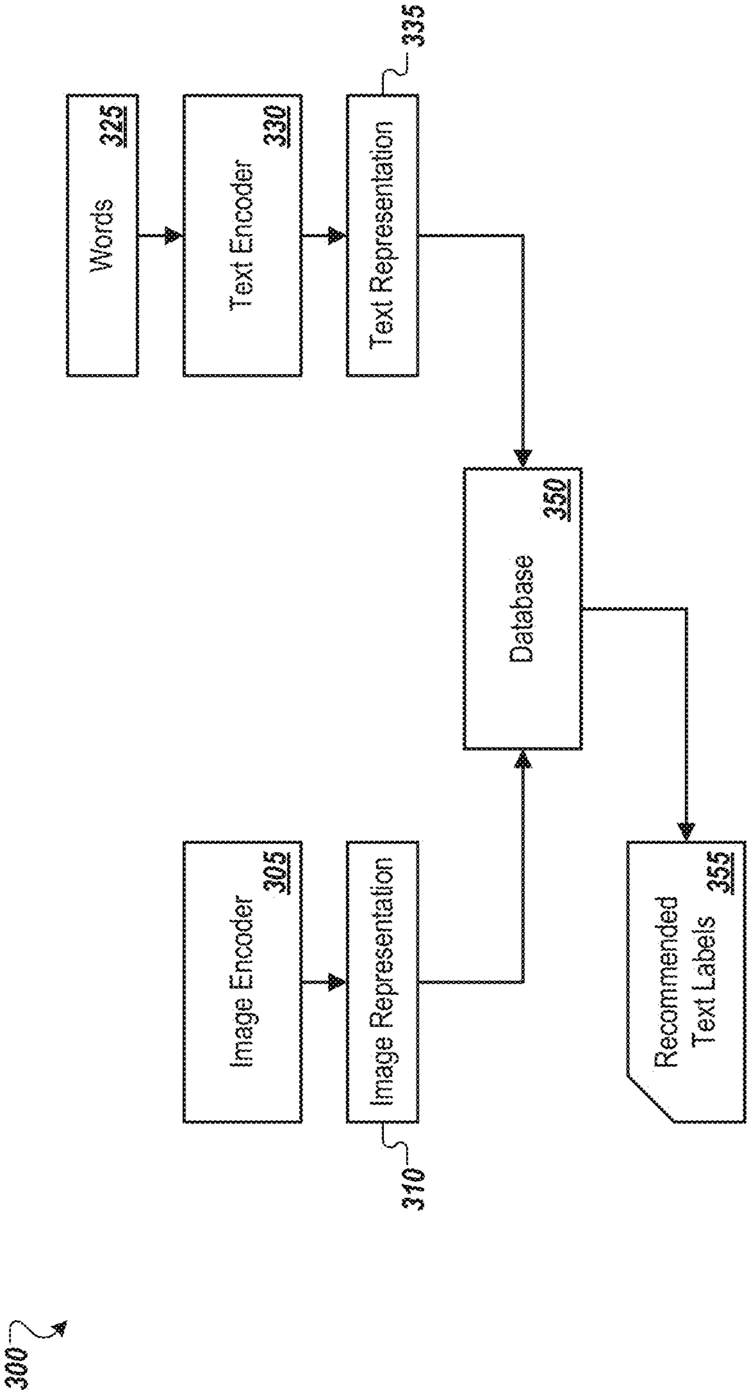
FIG. 3 illustrates a block diagram of an example system for extracting text representations.

FIG. 3 illustrates a block diagram of an example system 300 for extracting text representations, in accordance with at least one embodiment of the present disclosure. The system 300 may include an image encoder 305, an image representation 310, words 325, a text encoder 330, a text representation 335, and a database 350.

Some of the elements of the system 300 may be the same or similar as the system 200 of FIG. 2, where the same or similar elements may perform similar operations, unless described otherwise. For example, the image encoder 305, the image representation 310, the text encoder 330, the text representation 335, and the database 350 of FIG. 3 may be the same or similar as the image encoder 205, the image representation 210, the text encoder 215, the text representation 220, and the database 250, respectively, of FIG. 1.

In some instances, the text representation 335 may be precomputed for the words 325 (e.g., a set of text labels). The text representation 335 may be stored in the database 350 and may be used for nearest-neighbor lookups. The words 325 may be sourced from anywhere, including, but not limited to, manual curation such as by the user of the system 300, machine extraction, etc. The system 300 may be operable to obtain the frames (images) and the image encoder 305 may be operable to compute the image representation 310 and use the image representation 310 to find the text representation 335 in the database 350. In some instances, the frames may be compressed and/or resized prior to processing by the image encoder 305. For example, a particular frame may be identified, compressed and/or resized, and subsequently processed into the image representation 310 based on a computation by the image encoder 305. In some instances, the frames may be obtained by pulling frames from a URL associated with the video. The frames may be automatically obtained by a machine learning system or device without transmission of images and/or data. In instances in which multiple image representations 310 are computed, the multiple image representations 310 may be combined into a composite representation (e.g., using mean pooling) and the composite representation of the image representations 310 may be used as input to find the text representations 335 in the database 350.

In some instances, the system 300 may be used to obtain recommended text labels 355 by comparing the image representation 310 to the text representation 335 in the database 350. For example, the image representation 310 may be compared to the text representation 335 using a representation similarity matching algorithm (similar to others described herein). Such processes may enable a user of the system 300 to obtain descriptive text (e.g., the recommended text labels 355) associated with an image (e.g., a frame) that may later be utilized in searching for an audio segment for the same frame.

Figure 4:
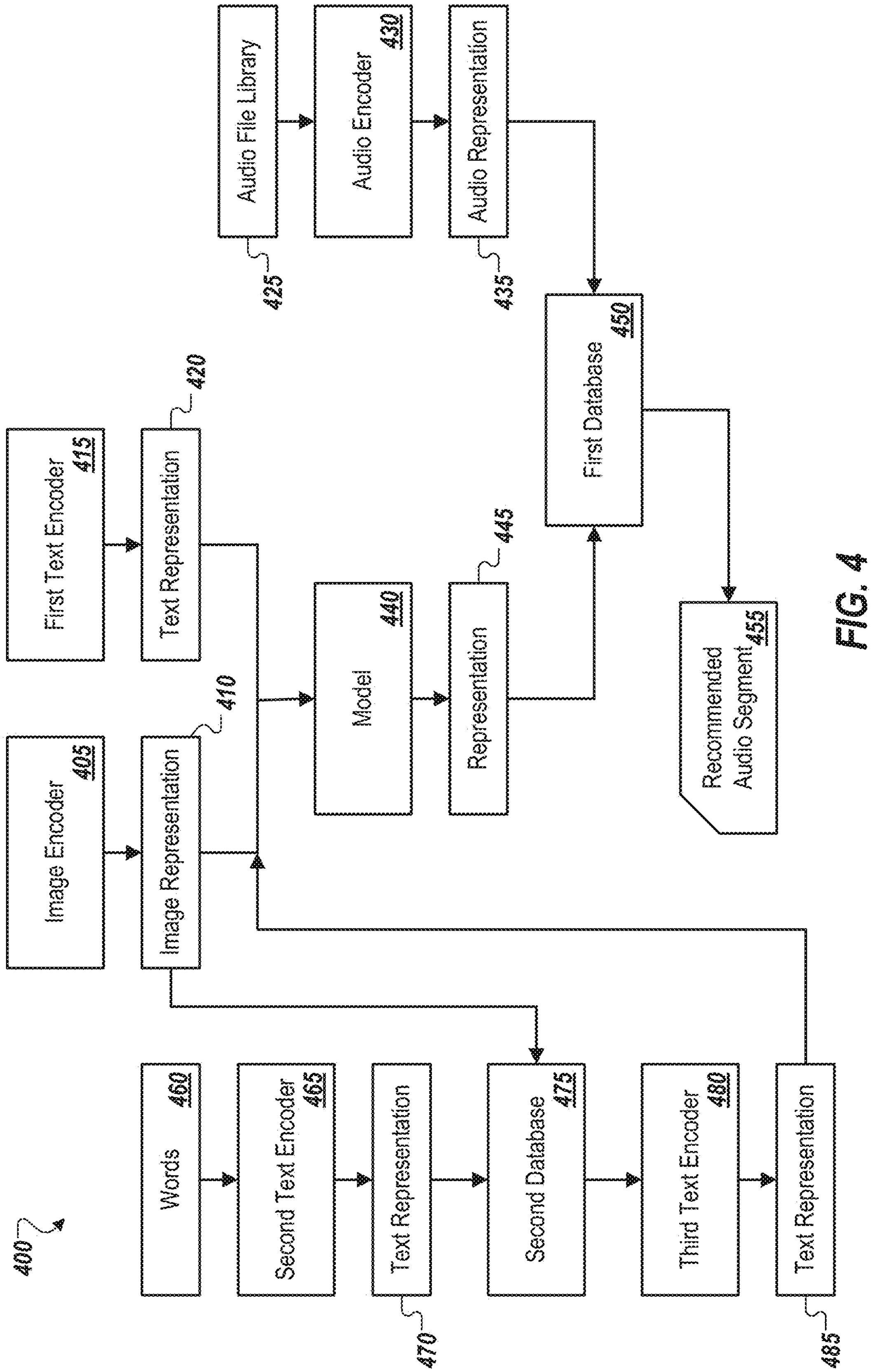
FIG. 4 illustrates a block diagram of an example system for video parsing and audio pairing.

FIG. 4 illustrates a block diagram of an example system 400 for video to audio recommendation, in accordance with at least one embodiment of the present disclosure. The system 400 may include an image encoder 405, an image representation 410, a first text encoder 415, a first text representation 420, an audio file library 425, an audio encoder 430, an audio representation 435, a model 440, a model representation 445, a first database 450, words 460, a second text encoder 465, a second text representation 470, a second database 475, a third text encoder 480, and a third text representation 485.

The system 400 may include elements that may be the same or similar as elements from the system 200 of FIG. 2 and/or the system 300 of FIG. 3. In some instances, the system 400 may be a combination of the previously described systems. Elements that are similarly numbered between the systems 200, 300, and 400 may be the same or similar element (e.g., the image encoder 205, the image encoder 305, and the image encoder 405, etc.) and/or may be operable to perform the same or similar operation.

In general, the system 400 may be similar to the system 200, in that the model 440 may be operable to compute the model representation 445 and based on a comparison of the model representation 445 to the audio representation 435 in the first database 450, a recommended audio segment 455 may be generated. The system 400 may further include a text representation portion that may be similar to some of the system 300. For example, the words 460, the second text encoder 465, the second text representation 470, and the second databased 475 may be the same or similar as the words 325, the text encoder 330, the text representation 335, and the database 350, respectively, of FIG. 3.

An example user flow may include obtaining one or more frames (e.g., images) and/or related text (e.g., search terms) to compute the image representation 410 and the first text representation 420, respectively, similar to the system 200 in FIG. 2. The image representation 410 may be input into the second database 475 and/or compared with the second text representation 470 to find recommended text based on text in the frames. Alternatively, or additionally, the recommended text may be computed into the third text representation 485 by the third text encoder 480 and the third text representation 485 may be combined with the image representation 410 and/or the first text representation 420 to be input into the model 440. The model representation 445 may be compared with the audio representation 435 in the first database 450 and based on a similarity search, as described herein, a recommended audio segment 455 may be generated by the system 400. In some instances, optical character recognition may be performed to extract text from the frame, where the extracted text may be included in the words 460, or in the image representation 410 input into the second database 475.

Figure 5:
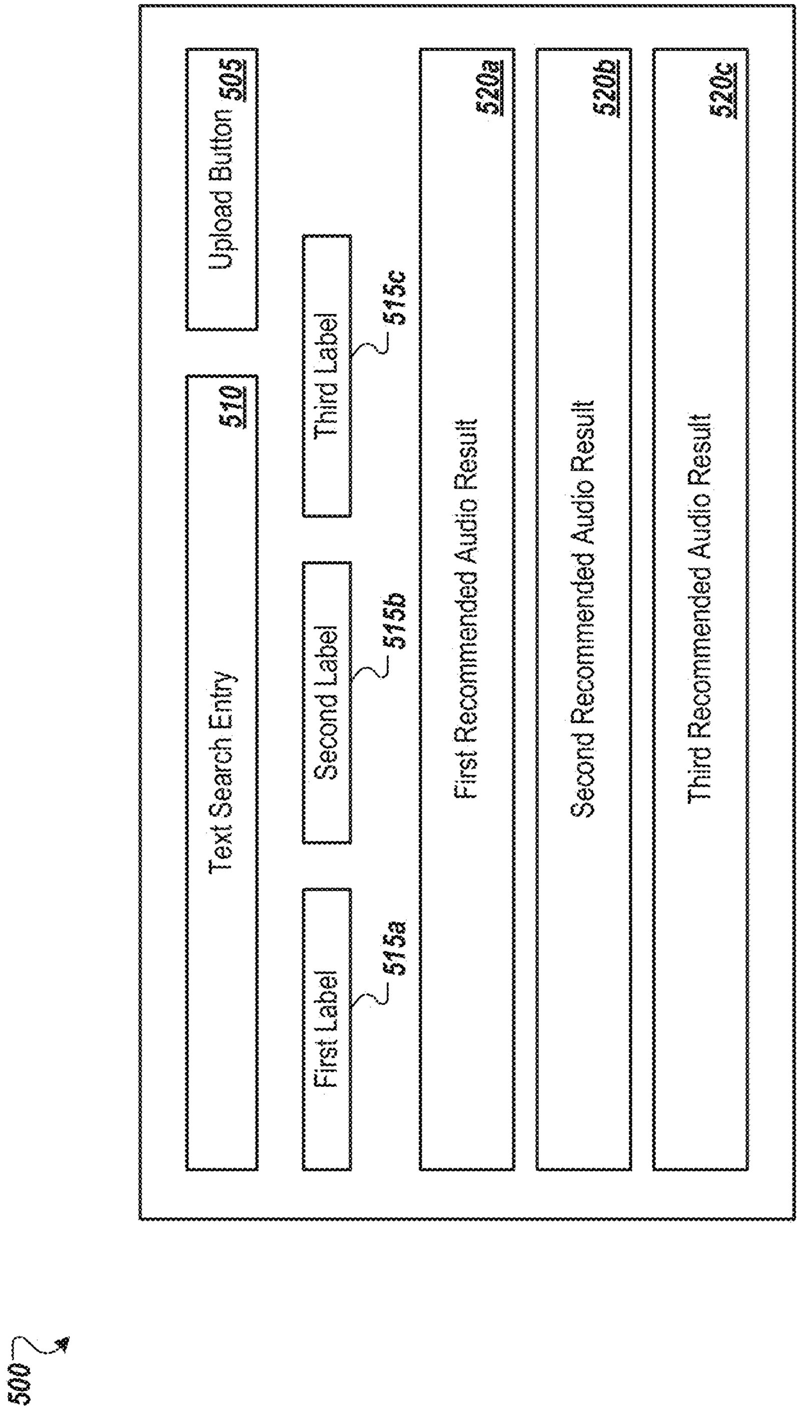
FIG. 5 illustrates an example user interface for video parsing and audio pairing.

FIG. 5 illustrates an example user interface 500 for video to audio recommendation, in accordance with at least one embodiment of the present disclosure. The user interface 500 may include an upload button 505, a text search entry 510, a first label 515*a*, a second label 515*b*, a third label 515*c*, referred to collectively as the labels 515, a first recommended audio result 520*a*, a second recommended audio result 520*b*, and a third recommended audio result 520*c*, referred to collectively as the recommended audio results 520.

In some instances, a user of the user interface 500 may upload a video using the upload button 505. Alternatively, or additionally, the user may drag and drop the video within the user interface 500, or input a path to the video. The underlying system may be operable to extract one or more text labels, such as the first label 515*a* and the second label 515*b*, that may be related to the video and/or may be used to determine recommended audio segments. Alternatively, or additionally, the user may enter a text label into the text search entry 510, which may be added to the text labels, such as the third label 515*c*. Alternatively, or additionally, the user may be operable to remove one or more of the labels 515, which may cause the recommended audio results 520 to be updated.

Based on the labels 515 and the frame, the user interface 500 may present one or more of the recommended audio results 520 to the user. As changes occur to the labels 515 (e.g., the user adds more labels 515 and/or removes one or more labels 515), the recommended audio results 520 may update correspondingly.

Figure 6:
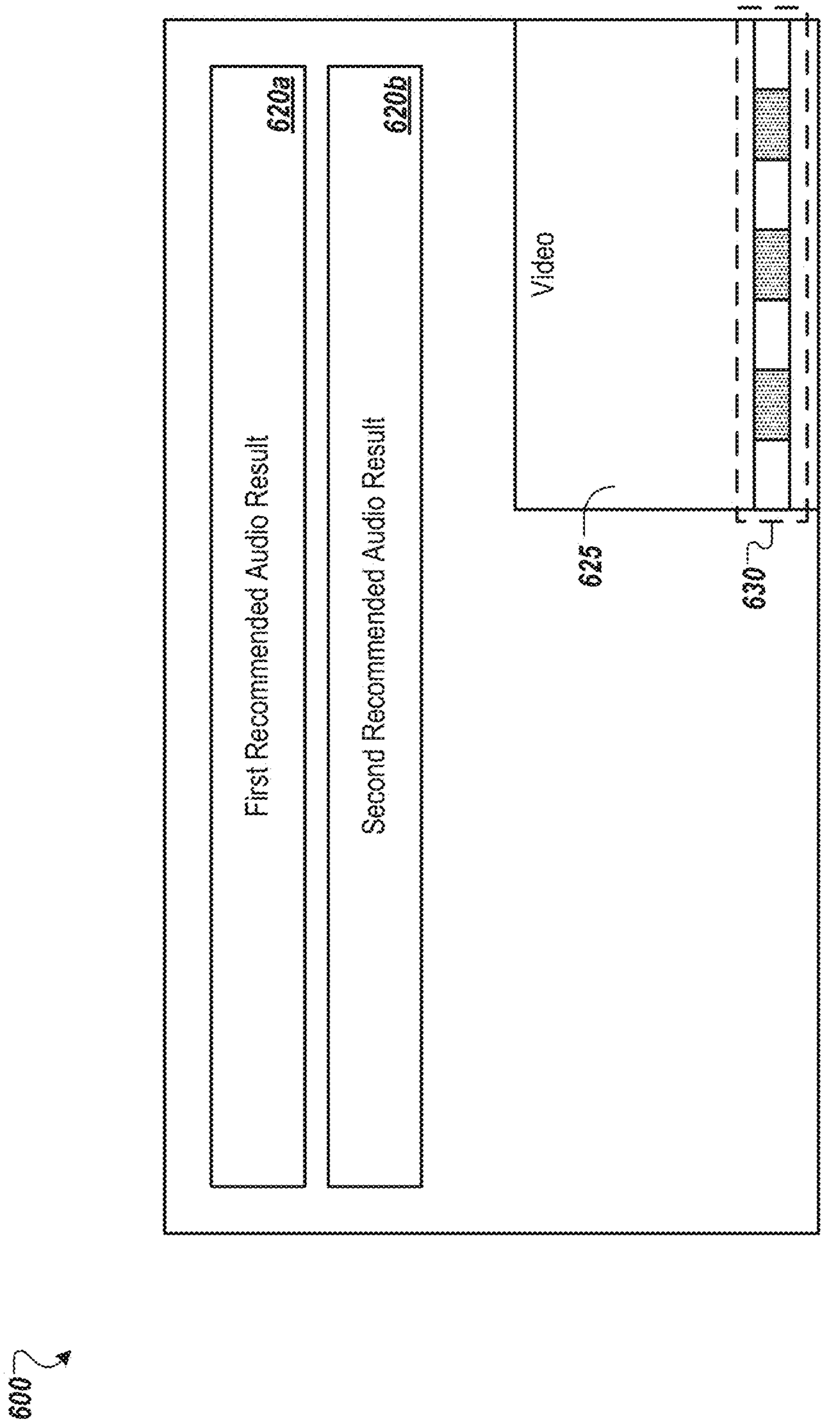
FIG. 6 illustrates another example user interface for video parsing and audio pairing.

FIG. 6 illustrates an example user interface 600 for video to audio recommendation, in accordance with at least one embodiment of the present disclosure. The user interface 600 may include a first recommended audio result 620*a*, a second recommended audio result 620*b*, collectively referred to as the recommended audio results 620, a video pane 625, and frame thumbnails 630.

In instances in which a video is uploaded to the user interface 600, the video may play in the video pane 625. During the play of the video in the video pane 625, the frame thumbnails 630 may be displayed in conjunction with the video. As such, the user may be operable to select a particular frame from the video and obtain an associated audio segment using the user interface 600.

As the video plays and the frame thumbnails progress, the underlying system (which may be one of the system 200, the system 300, and/or the system 400 described herein) may be operable to interpret the frames, computing representations thereof (as described herein, such as image representations and/or text representations), and perform similarity searches to obtain the first recommended audio result 620*a* and/or the second recommended audio result 620*b*. The recommended audio results 620 may be generated based on the representations associated with the video (and/or with particular frames from the video). The user may be operable to select the recommended audio results 620, which may cause the audio to play and/or may cause the audio to be merged with the video.

Figure 7:
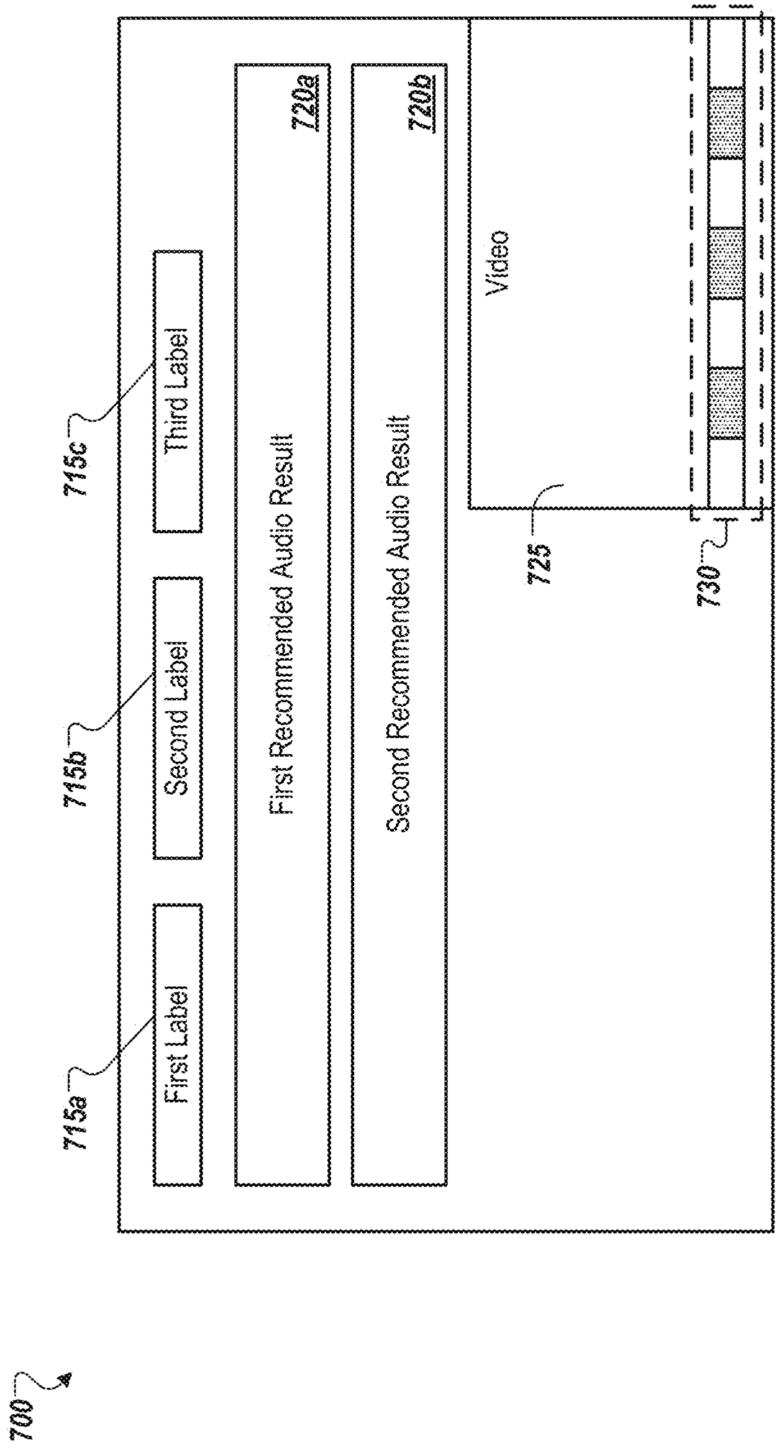
FIG. 7 illustrates a further example user interface for video parsing and audio pairing.

FIG. 7 illustrates an example user interface 700 for video to audio recommendation, in accordance with at least one embodiment of the present disclosure. The user interface 700 may include a first label 715*a*, a second label 715*b*, a third label 715*c*, referred to collectively as the labels 715, a first recommended audio result 720*a*, a second recommended audio result 720*b*, collectively referred to as the recommended audio results 720, a video pane 725, and frame thumbnails 730.

The user interface 700 may be an enhancement of the user interface 600 by including the labels associated with the video and/or frames that may be generated by the underlying system (which may be one of the system 200, the system 300, and/or the system 400 described herein). The uploaded video may be operable to play in the video pane 725 and the user may see thumbnails of the frames displayed in the frame thumbnail 730 as the video plays. As such, the user may be operable to select a particular frame from the frame thumbnails 730. The underlying system may be operable to analyze the frames, compute representations thereof, and perform similarity searches relative to the representations of the different portions of the video/frames. The underlying system may be operable to compute and present text representations (e.g., the labels 715) obtained from the video/frames, which may affect the recommended audio results 720. For example, identifying a first text representation (e.g., the first label 715*a*) may cause the first recommended audio result 720*a* to be displayed, and identifying a second text representation (e.g., the second label 715*b*) may cause the second recommended audio result 720*b* to be displayed in the user interface 700, and so forth.

In instances in which the labels 715 are updated (either by the underlying system identifying additional text representations and/or via user input of additional labels), the underlying system may be operable to determine one or more additional representations and/or combine the additional representations with existing representations. Using the updated representations, the underlying system may perform additional similarity searches and present updated (or new) recommended audio results 720 to the user. Alternatively, or additionally, the user may iteratively add and/or remove labels to continue to adjust the recommended audio results 720 displayed in the user interface 700.

In some instances, the user may be operable to synchronize playback of the video in the video pane 725 with selected audio (e.g., one of the recommended audio results 720), such as by adjusting how the video and audio are synchronized. For example, the user may select a particular portion of the video to play and may also select when the corresponding selected audio result may play. In such instances, the video and audio may be "in sync," but may be adjusted by the user as desired.

Figure 8:
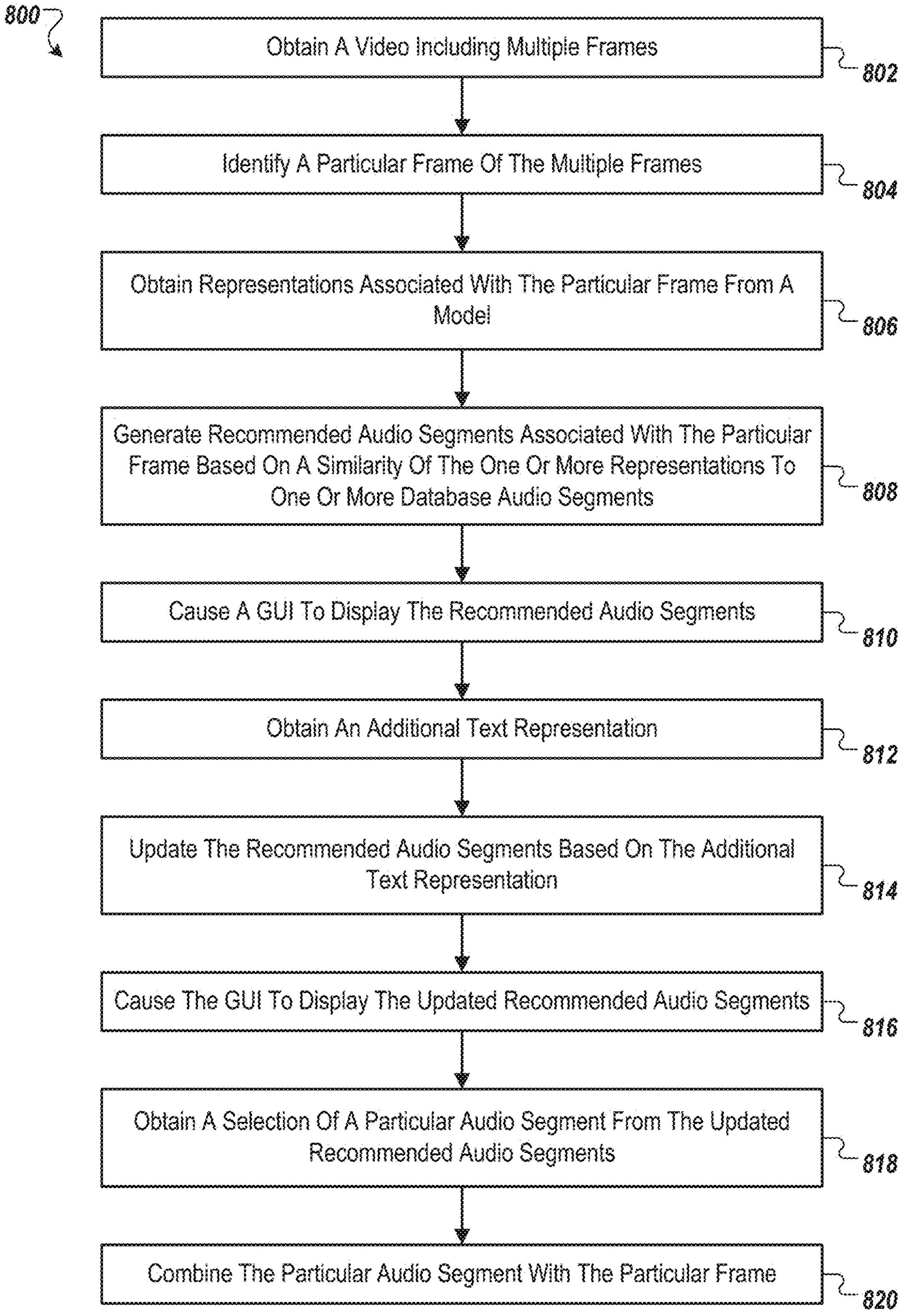
FIG. 8 illustrates a flowchart of an example method of video parsing and audio pairing.

FIG. 8 illustrates a flowchart of an example method 800 of video to audio recommendation, in accordance with at least one embodiment of the present disclosure. The method 800 may be performed by processing logic that may include hardware (circuitry, dedicated logic, etc.), software (such as is run on a general purpose computer system or a dedicated machine), or a combination of both, which processing logic may be included in any computer system or device such as the model 140 of FIG. 1.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification may be capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

At block 802, a video including multiple frames may be obtained.

At block 804, a particular frame of the multiple frames may be identified. In some instances, the particular frame may be selected by a second user input relative to the video displayed in a graphical user interface.

At block 806, one or more representations associated with the particular frame may be obtained from a model. The model may be trained using inputs from one or more of multiple data pairs, text representations, and/or image representations. In some instances, a data pair of the multiple data pairs may be a text-audio pair. Alternatively, or additionally, the one or more representations may include text and may be obtained from the particular frame via optical character recognition.

In some instances, one or more of the multiple data pairs, the text representations, and/or the image representations may be mean pooled together prior to being the inputs to the model. Alternatively, or additionally, the one or more representations may be individually assigned a weight based on a representation type. In some instances, the weight may be adjusted in response to a user input.

At block 808, one or more recommended audio segments associated with the particular frame may be generated by the model. The recommended audio segments may be based on a similarity of the one or more representations to one or more database audio segments stored in a database. In some instances, the one or more recommended audio segments may be recommended in view of a prior particular audio selection. In some embodiments, the similarity between the one or more representations and the database audio segments may be maximized using a gradient-descent based machine learning technique. Alternatively, or additionally, the similarity between the one or more representations and the database audio segments may be measured using one of a cosine similarity or a negative mean standard error similarity. In these and other embodiments, the database audio segments may be precomputed, stored in the database, and/or searched using a nearest neighbor search.

At block 810, a graphical user interface (GUI) may be caused to display the one or more recommended audio segments associated with the particular frame.

At block 812, an additional text representation may be obtained from a user input.

At block 814, the one or more recommended audio segments associated with the particular frame may be updated based on the additional text representation.

At block 816, the GUI may be caused to display the updated one or more recommended audio segments associated with the particular frame.

At block 818, a selection of a particular audio segment from the updated one or more recommended audio segments may be obtained. In some instances, the selection of the particular audio segment relative to the one or more recommended audio segments may be in response to a user input.

At block 820, the particular audio segment may be combined with the particular frame.

Modifications, additions, or omissions may be made to the method 800 without departing from the scope of the present disclosure. For example, the designations of different elements in the manner described is meant to help explain concepts described herein and is not limiting. Further, the method 800 may include any number of other elements or may be implemented within other systems or contexts than those described.

Figure 9:
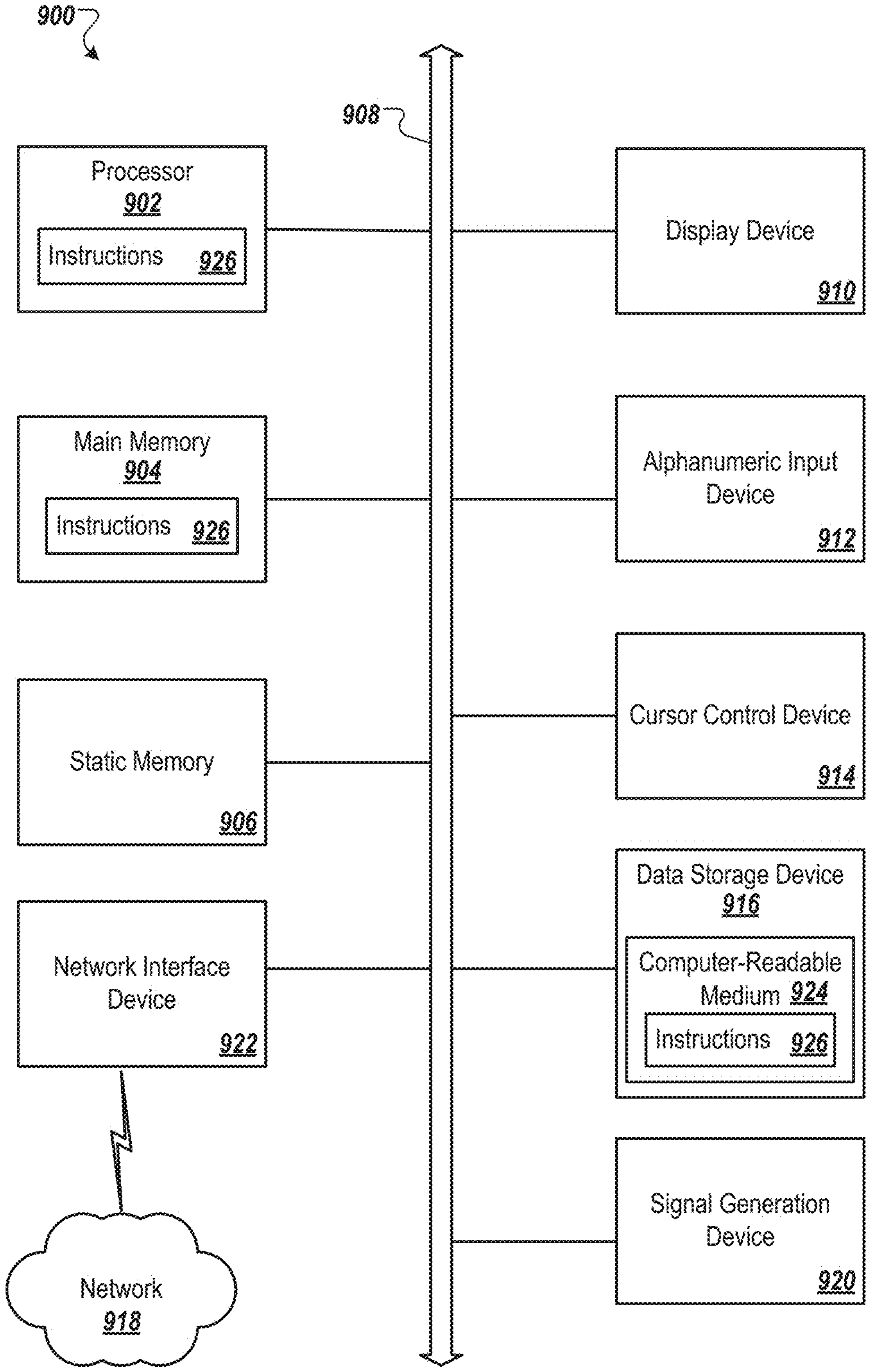
FIG. 9 illustrates an example computing device.

FIG. 9 illustrates an example computing device 900 within which a set of instructions, for causing the machine to perform any one or more of the methods discussed herein, may be executed. The computing device 900 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The computing device 900 includes a processing device 902 (e.g., a processor), a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 916, which communicate with each other via a bus 908.

The processing device 902 represents one or more general-purpose processing devices such as a microprocessor, central processing unit, or the like. More particularly, the processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also include one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computing device 900 may further include a network interface device 922 which may communicate with a network 918. The computing device 900 also may include a display device 910 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker). In at least one implementation, the display device 910, the alphanumeric input device 912, and the cursor control device 914 may be combined into a single component or device (e.g., an LCD touch screen).

The data storage device 916 may include a computer-readable storage medium 924 on which is stored one or more sets of instructions 926 embodying any one or more of the methods or functions described herein. The instructions 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 918 via the network interface device 922.

While the computer-readable storage medium 924 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A method, comprising:

obtaining a video comprising a plurality of frames;

identifying a particular frame of the plurality of frames;

obtaining one or more representations associated with the particular frame from a model, the model trained using inputs from one or more of a plurality of data pairs, text representations, and image representations;

generating, by the model, one or more recommended audio segments associated with the particular frame based on a similarity of the one or more representations to one or more database audio segments stored in a database;

causing a graphical user interface (GUI) to display the one or more recommended audio segments associated with the particular frame;

obtaining an additional text representation that includes a label for the particular frame;

updating, by the model, the one or more recommended audio segments associated with the particular frame based on the additional text representation, including combining the additional text representation with the one or more representations and re-determining the similarity to the one or more database audio segments;

causing the GUI to display the updated one or more recommended audio segments associated with the particular frame;

obtaining a selection of a particular audio segment from the updated one or more recommended audio segments; and combining the particular audio segment with the particular frame.

2. The method of claim 1, wherein the one or more recommended audio segments are recommended in view of a prior particular audio selection.

3. The method of claim 1, wherein one or more of the plurality of data pairs, the text representations, and the image representations are mean pooled together prior to being the inputs to the model.

4. The method of claim 1, wherein the one or more representations are individually assigned a weight based on a representation type.

5. The method of claim 4, wherein, in response to a second user input, the weight is adjusted.

6. The method of claim 1, wherein a data pair of the plurality of data pairs is a text-audio pair.

7. The method of claim 1, wherein the one or more representations include text and are obtained from the particular frame via optical character recognition.

8. The method of claim 1, wherein the similarity between the one or more representations and the database audio segments is maximized using a gradient-descent based machine learning technique.

9. The method of claim 1, wherein the similarity between the one or more representations and the database audio segments is measured using one of a cosine similarity or a negative mean standard error similarity.

10. The method of claim 1, wherein the database audio segments are precomputed, stored in the database, and searched using a nearest neighbor search.

11. The method of claim 1, wherein the selection of the particular audio segment relative to the one or more recommended audio segments is in response to a second user input.

12. The method of claim 1, wherein the particular frame is selected by a second user input relative to the video displayed in a graphical user interface.

13. A system, comprising:

a model;

a database;

a processor, operable to:

obtain a video comprising a plurality of frames;

identify a particular frame of the plurality of frames;

obtain one or more representations associated with the particular frame from the model, the model trained using inputs from one or more of a plurality of data pairs, text representations, and image representations;

obtain one or more recommended audio segments, generated by the model, associated with the particular frame based on a similarity of the one or more representations to one or more database audio segments stored in the database;

cause a graphical user interface (GUI) to display the one or more recommended audio segments associated with the particular frame;

obtain an additional text representation that includes a label for the particular frame;

update, by the model, the one or more recommended audio segments associated with the particular frame based on the additional text representation, including combining the additional text representation with the one or more representations and re-determining the similarity to the one or more database audio segments;

cause the GUI to display the updated one or more recommended audio segments associated with the particular frame;

obtain a selection of a particular audio segment from the updated one or more recommended audio segments; and combine the particular audio segment with the particular frame.

14. The system of claim 13, wherein the one or more recommended audio segments are recommended in view of a prior particular audio selection.

15. The system of claim 13, wherein one or more of the plurality of data pairs, the text representations, and the image representations are mean pooled together prior to being the inputs to the model.

16. The system of claim 13, wherein the one or more representations are individually assigned a weight based on a representation type.

17. The system of claim 13, wherein the similarity between the one or more representations and the database audio segments is maximized using a gradient-descent based machine learning technique.

18. The system of claim 13, wherein the similarity between the one or more representations and the database audio segments is measured using one of a cosine similarity or a negative mean standard error similarity.

19. The system of claim 13, wherein the selection of the particular audio segment relative to the one or more recommended audio segments is in response to a second user input.

20. The system of claim 13, wherein the particular frame is selected by a second user input relative to the video displayed in a graphical user interface.

* * * * *